July 17, 1962   G. SHAPIRO   3,045,202
HIGH FREQUENCY COAXIAL COUPLING
Original Filed Aug. 12, 1954   2 Sheets-Sheet 1

INVENTOR
GUSTAVE SHAPIRO

INVENTOR
GUSTAVE SHAPIRO

3,045,202
HIGH FREQUENCY COAXIAL COUPLING
Gustave Shapiro, Silver Spring, Md., assignor to the United States of America as represented by the Secretary of the Navy
Original application Aug. 12, 1954, Ser. No. 449,534, now Patent No. 2,879,491, dated Mar. 24, 1959. Divided and this application Dec. 31, 1958, Ser. No. 784,409
3 Claims. (Cl. 339—64)
(Granted under Title 35, U.S. Code (1952), sec. 266)

The invention described herein may be manufactured and used by or for the Government of the United States of America for governmental purposes without the payment of any royalties thereon or therefor.

This application is a division of application Serial No. 449,534, filed August 12, 1954, now Patent No. 2,879,491, patented March 24, 1959, for Universal Plug System.

This invention relates to high frequency coupling devices which facilitate the joining of an electronic sub-assembly with the remainder of an electronic device.

In present day practice it is common to detachably mount a plurality of complete electronic sub-assemblies on an electronic device. However, each sub-assembly often requires a combination of low frequency connections, high frequency connections, and mechanical couplings for transmitting mechanical motion to components within the sub-assembly. In addition, in many applications it is necessary to provide cooling for the entire electronic unit and sub-assemblies to prevent overheating. Furthermore, some technical procedures require that a sub-assembly which is to be mounted on an electronic device be hermetically sealed.

The present invention discloses a plug system which facilitates the assembling and disassembling of an electronic sub-assembly with the remainder of an electronic device where the sub-assembly requires high frequency connections.

It is therefore an object of this invention to provide a high frequency coupling device which is self-aligning and which can be used where hermetic sealing is required.

Other objects and many of the attendant advantages of this invention will be readily appreciated as the same becomes better understood by reference to the following detailed description when considered in connection with the accompanying drawings wherein.

Figure 1:
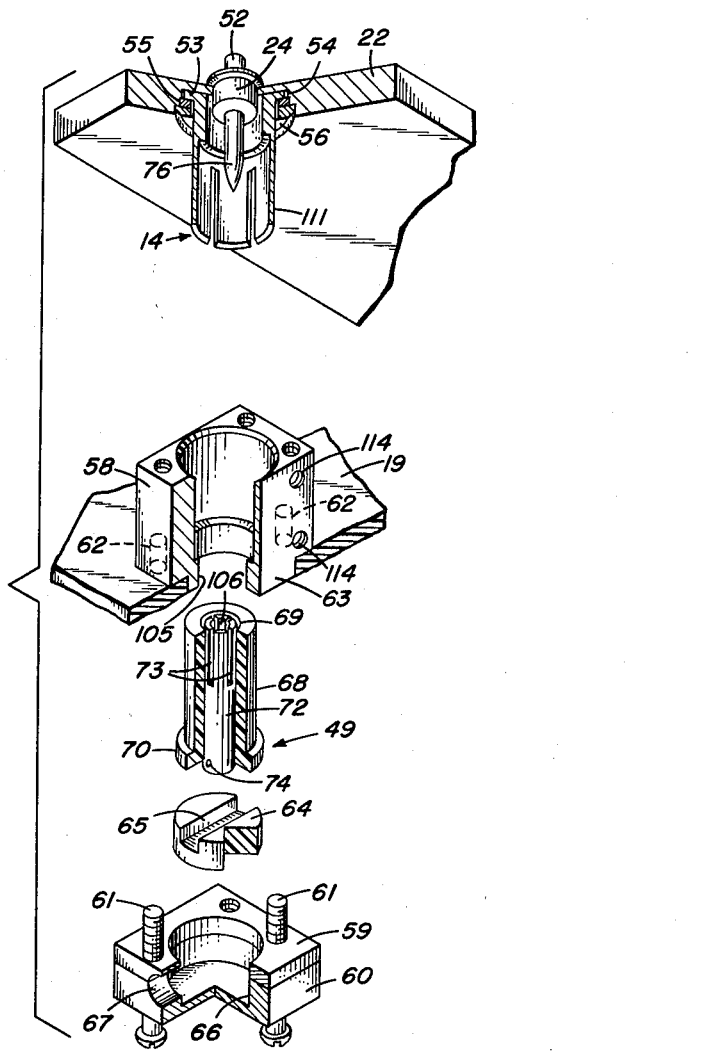
FIG. 1 is an exploded view of an embodiment of the invention.

The male assembly 14 consists of a coaxial plug shell 111 and center pin 52, the latter being rigidly affixed to base plate 22 by means of conventional glass to metal seals 24. Coaxial plug shell 111 has an outwardly flared rim 53 which is adapted to fit into an oversized bore 54 in base plate 22. Spring washer 55 is interposed between the flared end of plug shell 111 and retaining ring 56 to insure good electrical contact between elements 111 and 22. The retaining ring 56 is pressed into base plate 22 to cause the spring washer 55 to hold flared rim 53 in contact with base plate 22. The base plate 22 may then have the portions thereof proximate to retaining ring 56 and stepped to securely hold retaining ring 56 on base plate 22. There is a clearance space between the inner peripheries of retaining ring 56 and washer 55. There is also a clearance space between the outer periphery of coaxial plug shell 111 and washer 55. Oversized bore 54 allows a clearance space between the periphery of bore 54 and the outer periphery of rim 53. This construction permits coaxial plug shell 111 to float in a direction parallel to the plane of base plate 22 which in turn permits plug shell 111 to mate with the body portion 58 and dielectric tube 68 of coaxial connector block 49 even though there might be some original slight misalignment between the two.

Figure 2:
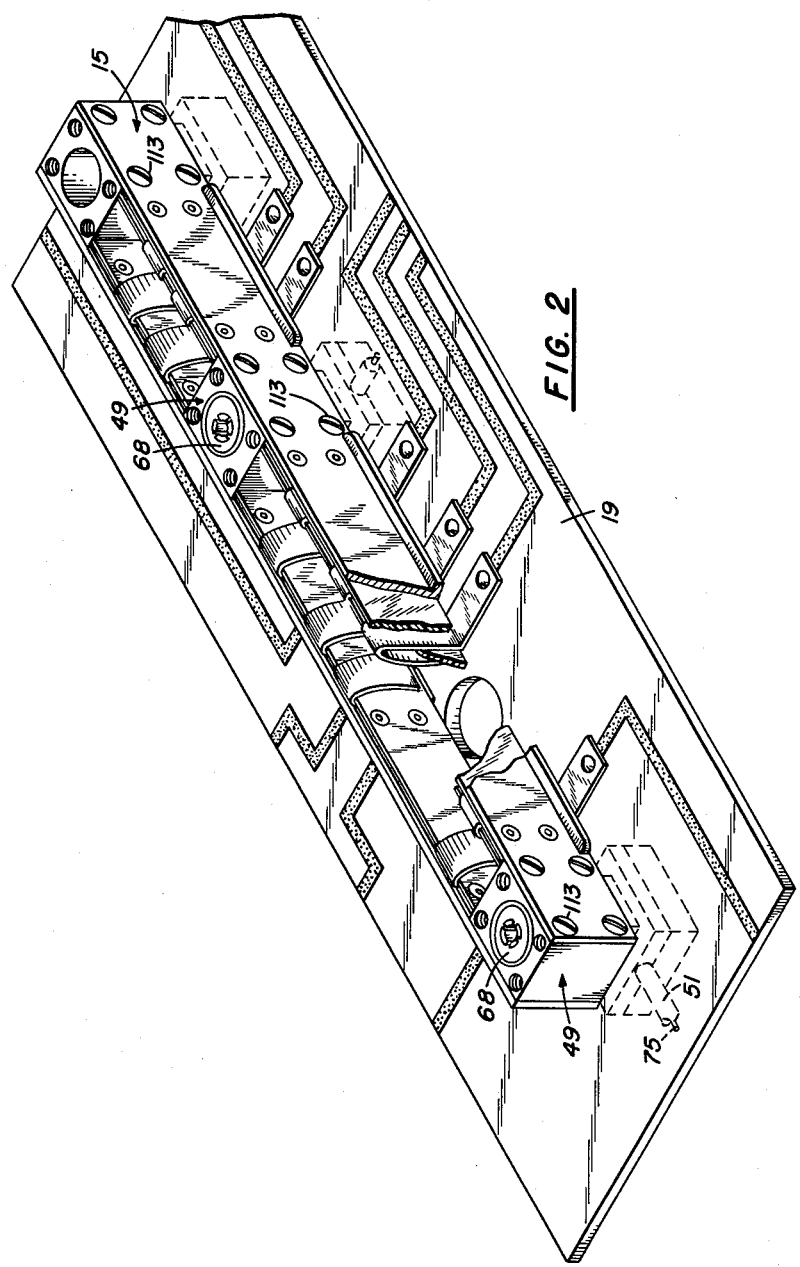
FIG. 2 is a perspective view showing the details of the female portion of the invention coupled to a printed circuit.

Coaxial female connector block 49 consists of the following parts: A body portion 58 which is adapted to be joined to the upper and lower base portions 59 and 60, respectively, by means of bolts 61 which in turn fit through holes in members 59 and 60 and thread into tapped holes 62 in body portion 58. Tapped holes 114 in body portion 58 are adapted to receive screws 113 for holding the female portion 49 in assembled relationship. Body portion 58 has a portion of reduced section 63 which fits through a mating cut out section (not numbered) in printed circuit plate 19. It can be seen that when parts 58, 59 and 60 are in their assembled position the base portion 59 and body portion 58 straddle printed circuit plate (FIG. 2) 19 to rigidly affix said coaxial connector block 49 to said printed circuit plate 19. An insulator disc 64 having slot 65 therein is adapted to seat in bore 66 of lower base portion 60 with said slot 65 aligned with opening 67 formed by base portions 59 and 60. A dielectric tube 68 having a bore 69 therein and a flared rim 70 seats on top of insulator disc 64. The flared rim 70 is of greater diameter than hole 105 in body portion 58 and serves the function of holding dielectric tube 68 within the assembled coaxial connector block 49. The female contact 72 which coacts with center pin 52 is a piece of spring metal tubing having slots 73 formed therein at one end which receives center pin 52. The end of female contact 72 is internally beveled at 106 to facilitate the entry of the end 76 of center pin 52. A diametral hole 74 is formed at the other end of female contact 72. In assembled condition of coaxial connector block 49, the end of the female contact 72 having hole 74 therein seats in slot 65 of insulator disc 64. The center lead 75, FIG. 2, of shielded cable 51 is soldered into hole 74. The outer shielding (not numbered) of shielded cable 51 is inserted into the opening 67 formed between base portions 59 and 60. When the screws 61 are tightened, the peripheral portions of opening 67 firmly clamp the shielded portions of cable 51. It is to be noted at this point that bore 69 in dielectric tube 68 is oversize with respect to female contact 72. It will be further noted that center pin 52 has its end 76 pointed. The pointed end construction of center pin 52 allows center pin 52 to enter female contact 72 in spite of any slight misalignment therebetween. The fact that bore 69 is oversized with respect to female contact 72 allows said female contact to move slightly within bore 69 to permit proper alignment of center pin 52 and said female contact 72 in spite of any slight original misalignment therebetween prior to the plug-in operation.

It will be noted that the above described male and female high frequency plug elements, when plugged together electrically couple the outer shielded portion of cable 51 to ground (base plate 22) via base portions 59 and 60, body portion 58, and coaxial plug shell 111. The center lead 75 of the shielded cable 51 is inserted into hole 74 of female contact 72 and soldered thereto, as mentioned above. When the plug system is plugged in, female contact 72 transmits high frequency electricity via center pin 52 to the required portions of a sub-assembly mounted on base plate 22.

It will be further noted that in the male portion of the high frequency plug the coaxial plug shell 111 has latitude of movement, as described above, whereas center pin 52 thereof is rigid. On the other hand, in coaxial connector block 49 the female contact 72 has latitude of movement, in the manner described above, whereas the body portion 58 of the coaxial connector block 49 is rigid. When these constructions are viewed in combination, it can be seen that in spite of any slight misalignment prior to the plugging in of the male and female members that both the center lead connections and the shield connections will tend to align themselves as required. Each of the aforementioned alignments is obtained independently of each other. In addition, it will be noted that while center pin 52 is rigidly affixed to base plate 22 by a glass to metal seal 24, the above described latitude of movement of female member 72 allows easy plugging together of the male and female portions of the high frequency connectors while preserving the feature of allowing a sub-assembly (not shown) mounted on base plate 22 to be hermetically sealed.

Obviously many modifications and variations of the present invention are possible in the light of the above teachings. It is therefore to be understood that within the scope of the appended claims the invention may be practiced otherwise than as specifically described.

What is claimed is:

1. A coaxial coupling assembly for coupling an electronic device, said coaxial coupling comprising a plate, a center contact pin rigidly mounted on said plate and insulated therefrom, a coaxial plug shell movably mounted in said plate in substantially concentric relationship with said center pin; said plug shell being capable of horizontal movement within said plate mounting a socket assembly including a body portion, said body portion being adapted to make electrical contact with said plug shell, a female contact movably mounted within said body portion and being insulated therefrom and adapted to make electrical contact with said center pin whereby any misalignment of said plug shell and said pin with said body portion and said female contact, respectively, can be compensated for by said movable elements and the electrical grounding connection between said body portion and said plate is completed as is the connection of said contact pin with said female contact.

2. A coaxial coupling assembly for coupling an electronic device comprising a male assembly and a socket assembly, a plate for supporting said male assembly, a bore in said plate, said male assembly including a center contact pin rigidly secured in said bore, a first annular recess in said plate, said recess being of larger diameter than and concentric with said center pin, a coaxial plug shell having a flared rim which is of smaller diameter than said recess and concentrically surrounds said center pin, a second annular recess of larger diameter than and concentric with said first annular recess, retaining means located in said second annular recess and in contact with said rim for holding the flared rim of said coaxial plug shell in contact with the upper wall of said first annular recess whereby said plug shell is capable to radial movement but restrained from any vertical movement with respect to said center contact pin, said socket assembly including a body portion rigidly affixed to a base portion, a bore in said body portion, a dielectric tube held within said last mentioned bore, an annular gap between said body portion and said dielectric tube, a female contact loosely held within said dielectric tube, said female contact thereby being capable of radial movement but restrained from vertical movement whereby any misalignment of said plug shell and said center contact pin with said body portion and said female contact, respectively, can be compensated for by said movable elements when said male assembly and said socket assembly are brought into mating relationship and said contact pin is received by said dielectric tube and said plug shell is received in said annular gap thereby completing an electrical and grounding circuit, respectively.

3. A coaxial coupling assembly for coupling an electronic device comprising a male assembly and a female socket assembly, a plate for supporting said male assembly, a bore in said plate, said plate having a first stepped recess of larger diameter than and concentric with said bore and a second stepped recess of larger diameter than and concentric with said first stepped recess, said male assembly including a center contact pin rigidly secured in said bore and insulated therefrom, a coaxial plug shell having a flared rim which is of smaller diameter than said first stepped recess, biasing means in said first stepped recess urging said flared rim of said coaxial plug shell into close contact with the uppermost wall of said first stepped recess, retaining means in contact with said biasing means for holding said biasing means and said flared rim in contact with said plate whereby said plug shell is capable of radial movement within said first stepped recess but restrained from any vertical movement with respect to said plate, said female socket assembly including a body portion rigidly affixed to a base portion, a bore in said body portion extending substantially the full length of said body with a stepped portion of lesser diameter at the lower end thereof, a dielectric tube having a flared rim of slightly less diameter than said bore in said body, the vertical outer wall of said dielectric tube being of lesser diameter than said flared rim leaving an annular gap between said tube and said bore in said body portion, a female contact loosely held within a bore in said dielectric tube, said female contact having a diametral hole in its lowermost end for receiving a lead wire, said female contact thereby being capable of radial movement within said bore in said body portion but restrained from vertical movement, a base portion for receiving said body portion, an insulator disk mounted in said base portion, a slot in the upper face of said disk, said slot being of sufficient width to receive the lowermost end of said female contact whereby said lead wire may pass therethrough to be connected to an outside source and any misalignment of said plug shell and said contact pin with said body portion and said female contact, respectively, can be compensated for by said movable elements and the electrical connection of said body portion with said plate and said contact pin with said female contact is completed.

References Cited in the file of this patent
UNITED STATES PATENTS

| | | |
|---|---|---|
| 1,101,939 | Knauff | June 30, 1914 |
| 2,615,949 | Hecking | Oct. 28, 1952 |
| 2,658,183 | Klostermann et al. | Nov. 3, 1953 |
| 2,702,376 | Brush | Feb. 15, 1955 |
| 2,879,491 | Shapiro | Mar. 24, 1959 |
| 2,882,510 | Colvin | Apr. 14, 1959 |